This invention relates to the exhibition of displays and more particularly to the exhibition of a reflection-type color image in such a way as to enhance the individual colors of the image and make it appear as a back-lighted transparency.

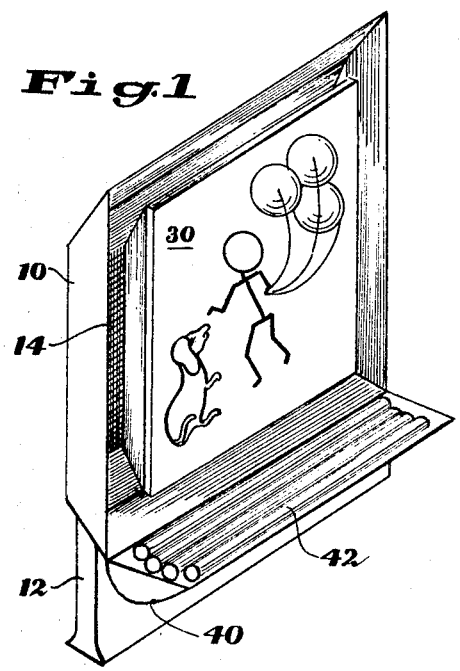
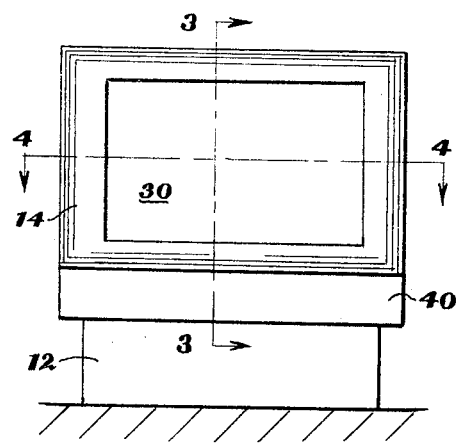
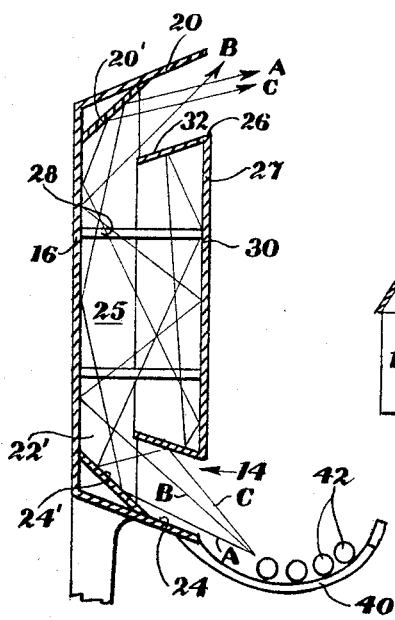
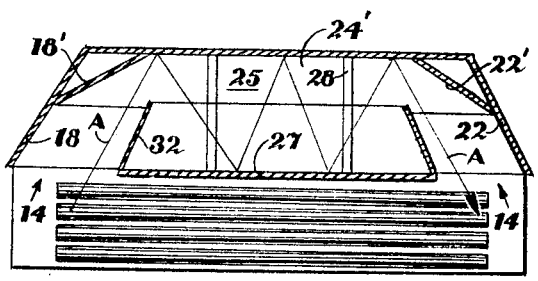
C. James Bartleson
Edwin J. Breneman
David L. MacAdam
INVENTORS 3,270,451
METHOD AND APPARATUS FOR EXHIBITING A DISPLAY
Christian James Bartleson, Edwin J. Breneman, and David L. MacAdam, Rochester, N.Y., assignors to Eastman Kodak Company, Rochester, N.Y., a corporation of New Jersey
Filed Oct. 21, 1963, Ser. No. 317,519
7 Claims. (Cl. 40—130)

It has been found that the colors of a back-lighted film transparency are pleasing to the viewer's eye because of the unusual vividness, sharply accentuated highlights and shadows, fidelity of detail, and brilliance of the contrasting colors contained therein. However, the use of a film transparency for display purposes has several inherent disadvantages and limitations. First, in daylight hours it is virtually impossible to project the image of a film transparency onto a viewing surface so that it can be satisfactorily observed as a reflection-type reproduction because of interference from sunlight. Secondly, although a film transparency can be illuminated by placing one or more lamps behind the transparency, the maximum size of a display made in this manner is limited by the size of the transparency. While it is possible to make color transparencies as large as outdoor advertising billboards, the cost and difficulty of handling such large transparencies make their use for display purposes impractical.

An object of this invention is to provide a reflection-type display which has the vividness and brilliance of colors comparable to that of a back-lighted film transparency.

Another object of this invention is to provide a method of displaying a reflection-type color print to an observer in such a manner that the print has sharply accentuated highlights and shadows comparable to that of a back-lighted film transparency.

Generally speaking, the basic principle used to obtain the novel effect of the present invention involves illuminating a reflection-type print display to a level of illumination higher than that of the environment in which it is located, surrounding the illuminated print with a dark border to accentuate the colors thereof by providing a visual contrast between the display and the immediate surroundings thereof, and trapping the stray light flux of the illuminating source that does not impinge upon the print to prevent said stray light from being reflected back to the point from which the display is viewed, and thereby detract from the display. The high intensity, uniform illumination of the print, combined with the stray light-absorption border, produces an unusual change in appearance of a reflection-type print and makes it appear as a back-lighted film transparency. Other objects and a fuller understanding of the principle of this invention can be had by referring to the following description and claims taken in conjunction with the drawings in which:

FIG. 1 is a perspective view of a display incorporating our invention;

FIG. 2 is a front view of the display shown in FIG. 1;

FIG. 3 is a side view, in cross-section, of the display taken along the line 3—3 of FIG. 2; and FIG. 4 is a top view, in cross-section, of the display taken along the line 4—4 of FIG. 2.

To better understand the invention described more fully hereinbelow, a brief summary of an operational mode will be helpful. A rectangular flat plate easel is centrally placed and supported within an opening in one wall of an especially constructed housing forming a "black cavity." A reflection-type color reproduction hereinafter referred to as a print, is mounted on the easel with the surface of the print lying in substantially the same plane as the plane defined by the peripheral edge of the opening of the housing. A light trough, containing a plurality of high intensity lamps, is located adjacent the lowermost edge of the opening of the housing to uniformly illuminate the entire surface of the print with high intensity light. The inner surfaces of the housing and the easel are coated to have a dark, glossy surface so that any residual or stray light is directed upwardly and will not be seen by the person viewing the display, generally from a point below the display. Illumination of the print by the high intensity light incident thereon, enhances the colors of the print to make each of the colors, and the shades thereof, appear to be substantially the same as if the display were a color transparency illuminated from behind.

Referring more particularly to the drawings, there is illustrated a display housing 10 supported on a base 12. It should be pointed out that the display will customarily be located above the eye level of those viewing it, e.g., on the roof of a building, or base 12 will be high enough to so located the display above ground level if it is resting on the ground. Housing 10 comprises a vertical back wall 16, and four side walls 18, 20, 22 and 24 which diverge forwardly from the back wall. Partitions 18', 20', 22' and 24', extending between each of the respective sidewalls 18, 20, 22 and 24, and back wall 16, cover the sharp corners at the back of the housing and in combination with the other walls of the housing and the easel 26 of the display define a tunnel 25. This structure provides a light trap 14 for the display as will be described hereinafter.

A rectangular flat easel 26 is centrally located within the opening of the housing by being mounted on supports 28 extending between the rear wall 27 of easel 26 and back wall 16 of housing 10. Easel 26 carries a colored display print 30 of the reflection-type such as a photographic print, in a plane substantially parallel to the plane of back wall 16. The outer edges of the side walls of the housing 10 lie in a plane in which the surface of print 30 also is located. A flanged member 32 having four sides corresponding to the four edges of easel 26 surrounds that area of easel 26 which carries print 30 and projects rearwardly towards rear wall 16, approximately half the distance separating these two surfaces. Each of the respective sides of flange member 32 lies in a plane substantially parallel to the plane of the oppositely disposed sidewalls 18, 20, 22 and 24 of the housing.

The inside surfaces of the walls of the housing 18, 20, 22 and 24, including the partitions 18', 20', 22' and 24', in combination with the four sides of the flange member 32 form the light trap 14. Preferably, all interior surfaces of light trap 14 and the back of easel 26 are coated with a dark, glossy material such that light flux captured within light trap 14 will be either absorbed or multiply reflected towards its center. However, as is best shown in FIGS. 1 and 2, the interior surface of light trap 14 provides a dark border surrounding print 30 which sharply contrasts with the colors of photographic print 30. A matte surface is less desirable in the light trap because when light impinges upon this type of surface, the light which is not absorbed, is reflected at random and is not necessarily directed towards the center of the light trap 14. A light trough 40, supported along one of its edges by wall 24, carries a plurality of high intensity lamps 42, each of which is aimed to illuminate a given area of print 30 so that as a group they will illuminate substantially the entire surface of the print uniformly with high intensity light.

Any stray light from one of the lamps 42, e.g., light which fails to strike and illuminate print 30, will enter light trap 14 and be absorbed therein or reflected in a direction away from the point from which the display is to be viewed. An example of light which enters light trap 14 from lamp 42 is shown in FIGS. 3 and 4, wherein light rays A, B and C from certain of the lamps 42 enter light trap 14. Each ray is multiply reflected in tunnel 25 before any light which is not absorbed in the light trap is directed out of the upper part of light trap 14 and in a direction away from the point of observation. Even though walls 16 and 27 of housing 10 and easel 26, respectively, are coated to have a black, glossy surface, approximately 90 to 95% of the intensity of each of the light rays is absorbed each time that a light ray impinges upon the surface. The reflective surfaces of partitions 18′, 20′, 22′ and 24′ are positioned within light trap 14 to direct all light flux impinging thereon upwardly and outwardly of the housing. As best shown by light ray C flanged member 32 prohibits light flux from being emitted from the upper part of light trap 14 without being reflected at least more than once therein.

It has been found that the average illumination of the surface of the print should be from 500 foot candles to 10,000 foot candles more than the ambient level of illumination, the higher level being required where there is a greater ambient illumination. For example, in the daylight hours the illumination provided by the lamps generally should be in the range of 3,000 to 10,000 foot candles to provide a sufficient increase above the ambient daylight illumination. At night, the average illumination for the print can be reduced and is generally approximately 500 to 1500 foot candles.

In using this particular method of illuminating a print, a startling visual phenomenon is obtained in which the colors of the print are enhanced to brilliant hues with a greater range of contrasts to sharply accentuate the highlights and shadows of the print. While the light trap basically prevents "spilled over" illumination from being observed, the light trap also serves as a border for the print when being viewed in daylight and as such, when glossy black, enhances the colors of the print.

The invention has been described in detail with particular reference to an embodiment thereof but it will be understood that variations and modifications can be effected within the spirit and scope of the invention as described hereinabove and as defined in the appended claims.

We claim:
1. In a display for exhibiting a reflection-type color reproduction of a subject in an environment of ambient light having a given level of illumination so that it will appear as a back-lighted transparency, the combination comprising
  (a) a substantially vertical support having a front surface on which said reflection-type reproduction is mounted and completely covers the same;
  (b) means, including a light source, for uniformly illuminating said reproduction to a level of illumination substantially greater than said given level of illumination of said ambient light; and
  (c) a light trap means of a dark contrasting color completely surrounding said support to prevent light from said illuminating means which does not impinge upon said reproduction from being reflected back to an observer located in front of said support and thereby provide a dark contrasting border completely surrounding said reproduction.

2. In a display for exhibiting a reflection-type color reproduction of a subject in an environment of ambient light having a given level of illumination so that it will appear as a back-lighted transparency, the combination comprising
  (a) a substantially vertical support having a front surface on which said reflection-type reproduction is mounted and completely covers the same;
  (b) means, including a light source, for uniformly illuminating said reproduction to a level of illumination substantially greater than said given level of illumination of said ambient light; and
  (c) means for trapping the stray light of said illuminating means that does not impinge upon said reproduction to prevent said stray light from being reflected back to an observer located in front of said support and thereby provide a dark contrasting border completely surrounding said reproduction, and comprising:
    (1) an open housing including a back wall and a plurality of side walls diverging forwardly therefrom to define an opening in said housing which is larger in area than said front surface; and
    (2) means for supporting said support within said housing with said front surface located in said opening and in spaced relation to the walls of said housing.

3. The display of claim 2 in which said light source is located adjacent and in front of the lower edge of said opening in the housing and directed upwardly toward said surface and away from the observer to cause any light therefrom which does not impinge upon said front surface to enter said light trap and be directed away from the observer.

4. The display of claim 3 in which said support for said reflection-type reproduction includes a rear surface which is spaced from and overlies a part of said back wall of said housing to define, in combination with the walls of said housing, a tunnel embracing said reproduction for multiply reflecting any light from said light source which enters said light trap means to prevent it from being seen by an observer.

5. The display of claim 4 in which said rear surface of said support includes a flange wall member located on the periphery of said rear wall which extends towards said back wall of said housing in substantially parallel relation to said side walls of said housing for part of the distance separating said rear wall from said back wall and forming a part of said light trap means, all of the walls forming said light trap means having a dark glossy coating thereon.

6. The method of displaying, in an environment having a given level of illumination, a reflection-type color print for viewing by an observer, comprising the steps of:
  (a) directing light onto the print to illuminate it to a level of illumination substantially greater than the level of illumination of the immediate environs of the print;
  (b) surrounding the illuminated print with a dark border to accentuate the colors of the print, and
  (c) trapping and reflecting away from the point of observation any portion of said light directed toward said print that impinges upon the dark border to prevent it from being reflected back to the point of observation.

7. The method of claim 6 in which the step of trapping and reflecting the light that impinges on said border includes the step of simultaneously absorbing a portion of said light to reduce the intensity thereof.

References Cited by the Examiner
UNITED STATES PATENTS

| | | | |
|---|---|---|---|
| 1,560,964 | 11/1925 | Bardy | 40—125 X |
| 1,802,570 | 4/1931 | Ogletree | 40—130 X |
| 2,147,959 | 2/1939 | Arbuckle | 40—130 |
| 2,365,010 | 12/1944 | Rogers | 40—125 X |
| 2,770,901 | 11/1956 | Morton | 40—130 X |

EUGENE R. CAPOZIO, *Primary Examiner.*

JEROME SCHNALL, *Examiner.*

H. F. ROSS, *Assistant Examiner.*